US012506201B2

(12) United States Patent
Kim

(10) Patent No.: US 12,506,201 B2
(45) Date of Patent: Dec. 23, 2025

(54) RECHARGEABLE BATTERY

(71) Applicant: SAMSUNG SDI CO., LTD., Yongin-si (KR)

(72) Inventor: Dae Kyu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 510 days.

(21) Appl. No.: 17/757,290

(22) PCT Filed: Jan. 6, 2021

(86) PCT No.: PCT/KR2021/000129
§ 371 (c)(1),
(2) Date: Jun. 13, 2022

(87) PCT Pub. No.: WO2021/221268
PCT Pub. Date: Nov. 4, 2021

(65) Prior Publication Data
US 2023/0024517 A1 Jan. 26, 2023

(30) Foreign Application Priority Data

Apr. 29, 2020 (KR) .................. 10-2020-0052569

(51) Int. Cl.
*H01M 50/153* (2021.01)
*H01M 10/04* (2006.01)
(Continued)

(52) U.S. Cl.
CPC ..... *H01M 50/153* (2021.01); *H01M 10/0427* (2013.01); *H01M 10/0431* (2013.01);
(Continued)

(58) Field of Classification Search
CPC ............. H01M 50/109; H01M 50/153; H01M 10/0427; H01M 50/181; H01M 50/183;
(Continued)

(56) References Cited

U.S. PATENT DOCUMENTS 6,372,381 B1    4/2002 Park et al.
7,916,452 B2    3/2011 Tasei et al.
(Continued)

FOREIGN PATENT DOCUMENTS

CN    106159350 A    11/2016
CN    108232051 A  * 6/2018 .......... H01M 50/147
(Continued)

OTHER PUBLICATIONS

International Search Report of PCT/KR2021/000129, Apr. 21, 2021, 5 pages.
(Continued)

*Primary Examiner* — Jessie Walls-Murray
(74) *Attorney, Agent, or Firm* — Womble Bond Dickinson (US) LLP

(57) ABSTRACT

A rechargeable battery according to one embodiment of the present invention includes: an electrode assembly having a separator interposed between a first electrode and a second electrode; a case including an upper case having an open lower portion and a penetration hole in the upper portion thereof, and a lower case having an open upper portion to seal the lower portion of the upper case, and accommodating the electrode assembly therein; and a cap plate coupled to the upper case so as to seal the penetration hole and electrically insulated from the upper case, wherein the upper case and the lower case are coupled such that partial regions overlap, and an upper end of the lower case protrudes inwardly and is latched and fixed to the outside of the upper case.

17 Claims, 9 Drawing Sheets

(51) Int. Cl.
  *H01M 50/109* (2021.01)
  *H01M 50/183* (2021.01)
  *H01M 50/533* (2021.01)

(52) U.S. Cl.
  CPC ....... *H01M 50/109* (2021.01); *H01M 50/183* (2021.01); *H01M 50/533* (2021.01)

(58) Field of Classification Search
  CPC . H01M 50/166; H01M 50/186; H01M 50/188
  See application file for complete search history.

(56) References Cited

U.S. PATENT DOCUMENTS

| | | |
|---|---|---|
| 9,614,247 B2 | 4/2017 | Ensling et al. |
| 2003/0162088 A1 | 8/2003 | Nakanishi et al. |
| 2008/0248384 A1 | 10/2008 | Yabushita et al. |
| 2014/0315061 A1 | 10/2014 | Wang |
| 2015/0236370 A1 | 8/2015 | Ensling et al. |
| 2017/0207491 A1* | 7/2017 | Tamachi ............. H01M 50/107 |
| 2020/0365835 A1 | 11/2020 | Jiang et al. |
| 2021/0328290 A1* | 10/2021 | Lee .................... H01M 50/531 |
| 2021/0408650 A1* | 12/2021 | Guo .................... H01M 50/586 |

FOREIGN PATENT DOCUMENTS

| | | |
|---|---|---|
| CN | 109192889 A | 1/2019 |
| CN | 210006773 U | 1/2020 |
| EP | 1028480 A2 | 8/2000 |
| EP | 3176848 A1 | 6/2017 |
| EP | 3550631 A1 | 10/2019 |
| JP | 5294248 B2 | 9/2013 |
| KR | 10-2003-0051612 A | 6/2003 |
| KR | 10-2020-0007559 A | 1/2020 |
| KR | 10-2020-0020619 A | 2/2020 |
| WO | WO 2014/072494 A1 | 5/2014 |
| WO | WO 2020/037535 A1 | 2/2020 |
| WO | WO 2020-057127 A1 | 3/2020 |

OTHER PUBLICATIONS

Chinese Office Action, with English translation, dated Dec. 1, 2023, issued in corresponding Chinese Patent Application No. 202180007641.8 (16 pages).

Chinese Office Action dated Jul. 27, 2024, issued in corresponding Chinese Patent Application No. 202180007641.8, 7 pages.

EPO Extended European Search Report dated Jul. 24, 2024, issued in corresponding European Patent Application No. 21797480.7, 7 pages.

* cited by examiner

RECHARGEABLE BATTERY

CROSS-REFERENCE TO RELATED APPLICATIONS

This application is a U.S. National Phase Patent Application of International Application Number PCT/KR2021/000129, filed on Jan. 6, 2021, which claims priority of Korean Patent Application Number 10-2020-0052569, filed on Apr. 29, 2020, the entire content of each of which is incorporated herein by reference.

TECHNICAL FIELD

The present invention relates to a rechargeable battery. More particularly, the present invention relates to an ultra-small rechargeable battery.

BACKGROUND ART

Unlike a primary battery that cannot be recharged, a rechargeable battery is a battery that can be charged and discharged. A low-capacity rechargeable battery is used for portable small electronic devices such as mobile phones, laptop computers, and camcorders, and a large-capacity battery is widely used as a power source for driving motors such as for hybrid vehicles.

Representative rechargeable batteries include a nickel-cadmium (Ni-Cd) battery, a nickel-hydrogen (Ni-MH) battery, a lithium (Li) battery, and a lithium ion (Li-ion) rechargeable battery. In particular, lithium ion rechargeable batteries have an operation voltage about three times higher than nickel-cadmium batteries or nickel-hydrogen batteries, which are widely used as power sources for portable electronic equipment. In addition, it is widely used in terms of high energy density per unit weight.

In particular, recently, as the demand for wearable devices such as headphones, earphones, smartwatches, and body-attached medical devices using Bluetooth increases, the need for an ultra-small rechargeable battery with high energy density is increasing.

As an example, the ultra-small rechargeable battery includes a coin-type battery (coin cell) or a button-type battery (button cell). In general, a coin-type cell (coin cell) or button cell (button cell) has a low height, and coupling is made between a cell cup, which is a half of the housing, and a cell top.

In this case, since a space is required for coupling and insulation between the cell cup and the cell tower, there is a problem in that the battery capacity is reduced. In addition, there is a problem in that the cell cup and the cell tower are separated from each other due to external impact.

DISCLOSURE

Technical Problem

One aspect of the present invention is to provide a rechargeable battery including a case in which the polarity is separated from the cap plate and the close and seal force is strengthened.

Technical Solution

A rechargeable battery according to an embodiment of the present invention includes: an electrode assembly in which a separator is disposed between a first electrode and a second electrode; a case that includes an upper case with a lower open side and including a penetration hole in an upper portion, and a lower case with an upper open side to close and seal the lower portion of the upper case and accommodates the electrode assembly therein; and a cap plate that is coupled with the upper case to close and seal the penetration hole, and is electrically connected with the upper case, wherein the upper case and the lower case are coupled to be partially overlapped, and an upper end of the lower case protruded in an inner direction and caught and fixed an outer side of the upper case.

One side of the upper case and one side of the lower case may be in contact with each other and are electrically connected.

The cap plate may be coupled to a circumference of the penetration hole, and may be parallel with a bottom surface of the lower case while being at least partially exposed to the outside.

A bonding member may be provided between the upper case and the cap plate, and the bonding member may be formed of an electrically insulating material.

The upper case and the cap plate may be heat-bonded through the bonding member.

The rechargeable battery may further include a sealing member that is provided between the upper case and the lower case in an area where the upper case and the lower case overlap.

The rechargeable battery may further include a first electrode tab that electrically connects the first electrode and the cap plate, and a second electrode tab that electrically connects the second electrode and the case.

The electrode assembly may be formed by spirally winding the first electrode, the second electrode, and the separator on a rotation axis that is arranged in a vertical direction on the bottom surface of the lower case.

The first electrode tab may be extended to an upper portion of the electrode assembly and welded to an inner surface of the cap plate, and the second electrode tab may extend to a lower portion of the electrode assembly and may be welded to an inner surface of the case.

The rechargeable battery may further include a first insulation member that is provided between the first electrode tab and the electrode assembly, and a second insulation member that is provided between the second electrode tab and the electrode assembly.

The cap plate may be coupled to the outside of the upper case and may have a flat shape that is all exposed to the outside.

The cap plate may be coupled to the inside of the upper case and may have a flat shape with a part exposed to the outside.

The upper case may include a support plate to which the cap plate is coupled, and an upper side plate extending downward from the support plate, the lower case may include a bottom plate, and a lower side plate extending from the bottom plate to the top and having a hook portion protruded in an inner direction at the end, and at least a portion of the upper side plate and at least a portion of the lower side plate may overlap each other in parallel.

A concave groove corresponding to the hook portion may be formed in the upper side plate and thus the hook portion may be inserted therein.

The hook portion may extend to a top surface of the upper case.

The hook portion may extend in the inner direction and thus an overlapping length with the upper side plate may be 30% or more of an upper side plate thickness.

The rechargeable battery may have a height-to-diameter ratio of 1 or less.

Advantageous Effects

According to the embodiment of the present invention, the cap plate in the form of a flat plate is bonded to the case through an electrical insulating material, and thus the cap plate and the case can be combined in a state in which the polarity is separated while securing the battery capacity.

In addition, fastening force and close and sealing force between upper case and lower case can be strengthened by engaging the upper case and lower case in an overlapping state.

MODE FOR INVENTION

Figure 1:
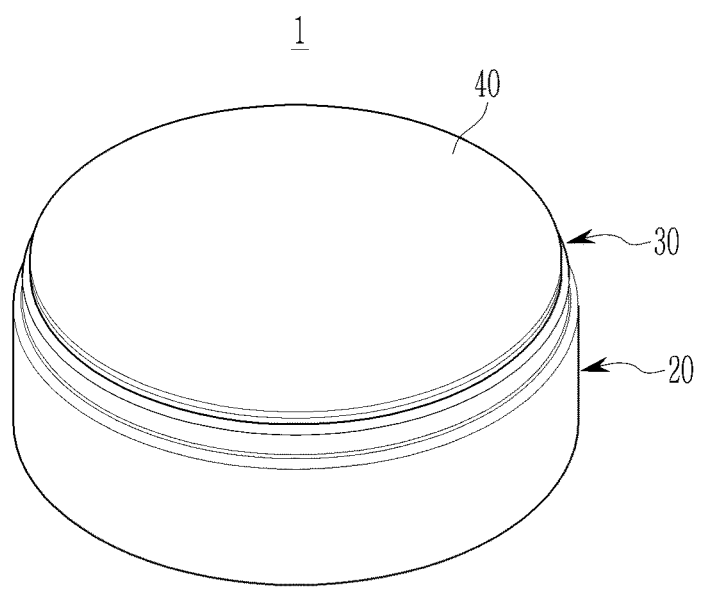
FIG. 1 is a perspective view of a rechargeable battery according to a first embodiment of the present invention.

The present invention will be described more fully hereinafter with reference to the accompanying drawings, in which embodiments of the invention are shown. As those skilled in the art would realize, the described embodiments may be modified in various different ways. In the present specification and drawing, the same symbol indicates the same constituent elements.

The drawings and description are to be regarded as illustrative in nature and not restrictive. Like reference numerals designate like elements throughout the specification.

In addition, since the size and thickness of each configuration shown in the drawings are arbitrarily indicated for better understanding and ease of description, the present invention is not necessarily limited to the drawings.

Throughout this specification, when it is described that an element is "combined" to another element, it includes not only the case that it is "directly combined" but also the case that "indirectly combined" through another member. In addition, unless explicitly described to the contrary, the word "comprise", and variations such as "comprises" or "comprising", will be understood to imply the inclusion of stated elements but not the exclusion of any other elements.

A rechargeable battery according to an embodiment of the present invention is an ultra-small battery, and may be a coin-type battery (coin cell) or a button-type battery (button cell). Here, the coin-type battery or button-type battery is a thin coin or button-shaped battery, and refers to a battery in which the ratio of height to diameter (height/diameter) is 1 or less.

Since the coin-type battery or button-type battery is mainly cylindrical, the cross-section in the horizontal direction is circular, but is not limited thereto, and a shape in which the cross-section in the horizontal direction is elliptical or polygonal may also be included therein. In this case, the diameter means the maximum distance with reference to the horizontal direction of the battery, and the height means the minimum distance from the flat bottom surface of the battery to the cross-section of the flat top of the battery.

However, the coin-type battery or button-type battery is not limited thereto as an example of the present invention, and a cylindrical or pin-type battery is also applicable to the present invention. However, hereinafter, a case in which the rechargeable battery according to an embodiment of the present invention is a coin-type battery or a button-type battery will be exemplarily described in detail.

Meanwhile, in the present specification, terms such as "inside" and "inner side" mean directions toward an electrode assembly 10, and terms such as "outside" and "outer side" mean the opposite direction. In addition, the term "upper", "upward", "lower", "downward", "height direction", "perpendicular direction", "vertical direction", and the like imply a direction that is perpendicular to a bottom plate 24 (refer to FIG. 3 and the like) of a case 20 (refer to FIG. 3 and the like), and the term "horizonal direction" and "lateral direction" imply a direction that is parallel with the bottom plate 24 (refer to FIG. 3 and the like).

Figure 2:
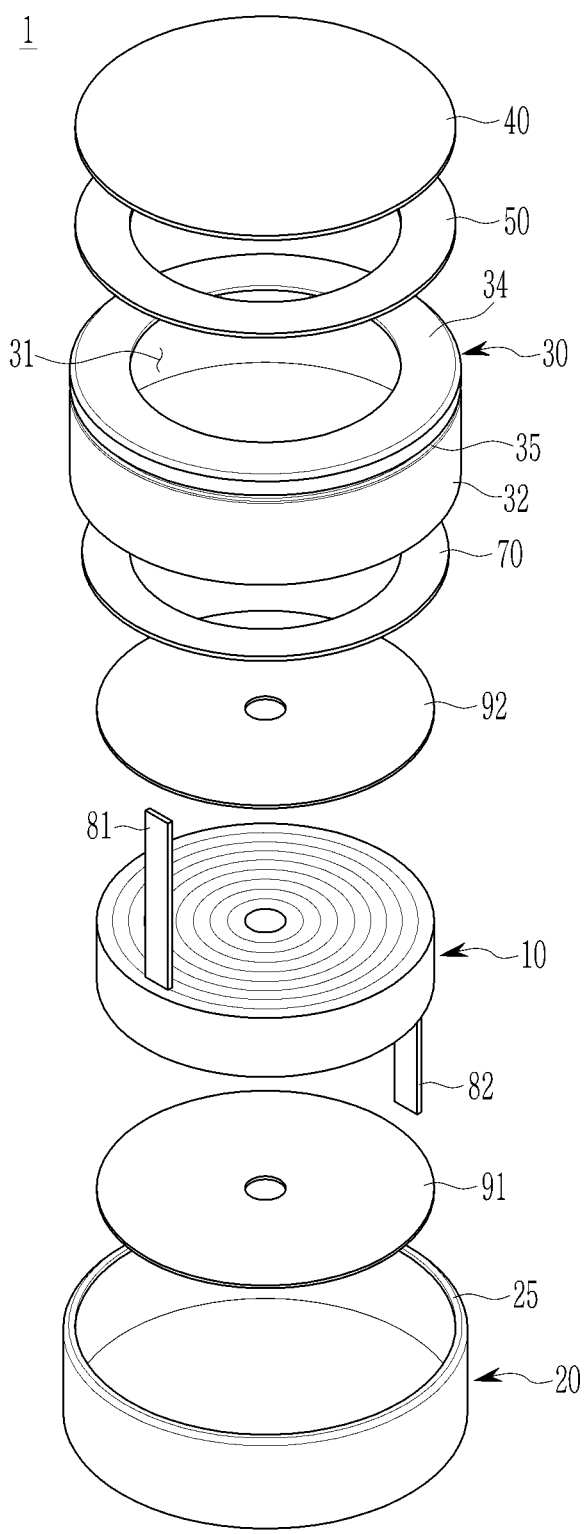
FIG. 2 is an exploded perspective view of the rechargeable battery according to the first embodiment of the present invention.
Figure 3:
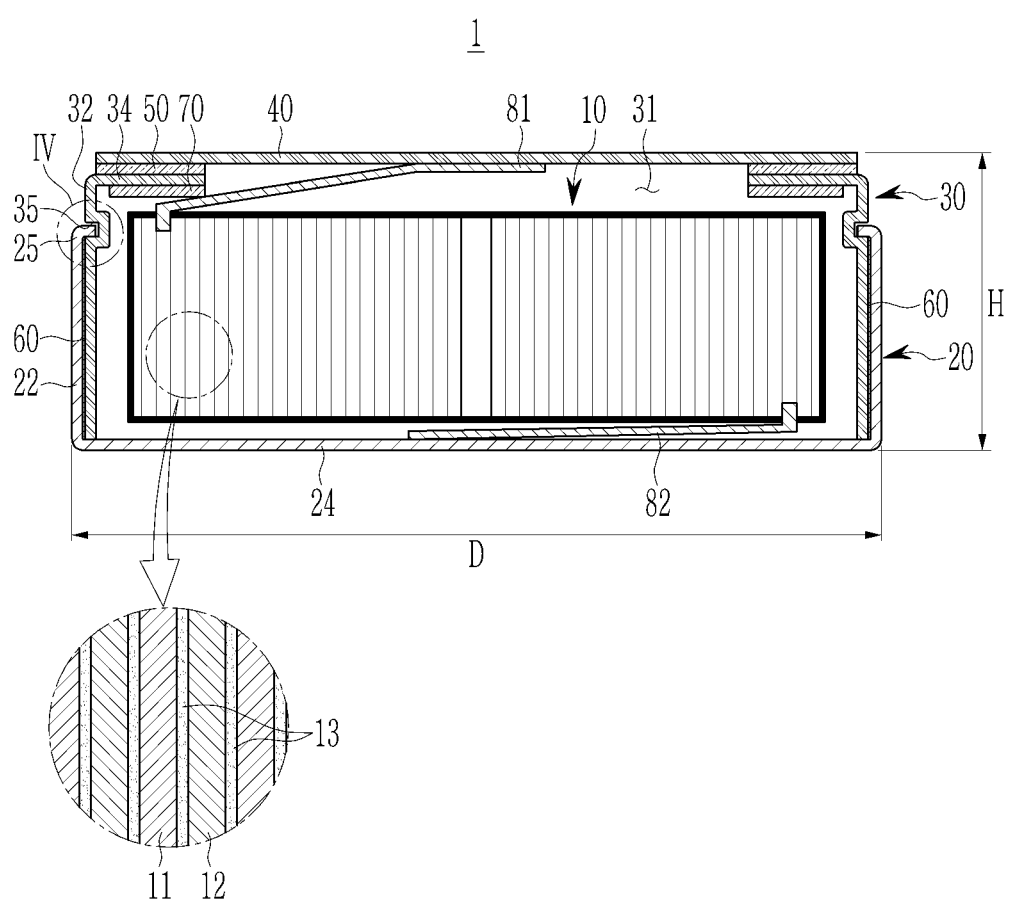
FIG. 3 is a cross-sectional view of the rechargeable battery according to the first embodiment of the present invention.
Figure 4:
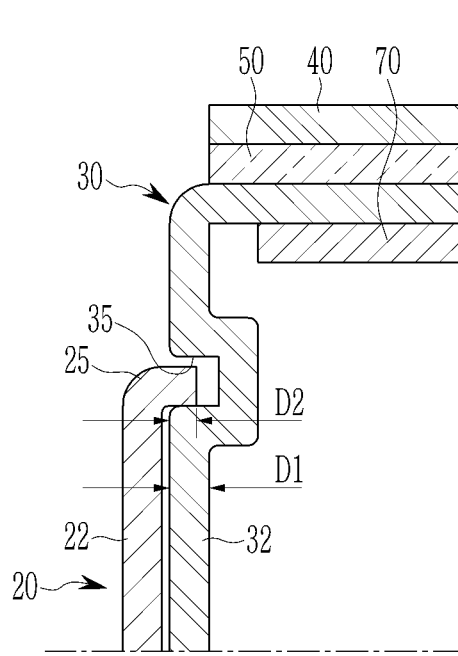
FIG. 4 is an enlarged view of the portion IV of FIG. 3.

FIG. 1 is a perspective view of a rechargeable battery according to a first embodiment of the present invention, FIG. 2 is an exploded perspective view of the rechargeable battery according to the first embodiment of the present invention, FIG. 3 is a cross-sectional view of the rechargeable battery according to the first embodiment of the present invention, and FIG. 4 is an enlarged view of the portion IV of FIG. 3.

Referring to FIG. 1 to FIG. 4, a rechargeable battery 1 according to a first embodiment of the present invention includes an electrode assembly 10, a case 30 formed of an upper case 30 and a lower case 20, and a cap plate 40.

The electrode assembly 10 includes a first electrode 11 (e.g., a cathode) and a second electrode 12 (e.g., an anode) that are provided at opposite sides of a separator 13, which is an electric insulator, and is formed by spirally winding the first electrode 11, the separator 13, and the second electrode 12. Accordingly, the electrode assembly 10 may have a jelly-roll shape, and is formed to charge and discharge a current. However, the shape of the electrode assembly 10 is not limited to the jelly roll type, and may be formed in a stack type in which the first and second electrodes are stacked with the separator disposed therebetween.

The wound axis of the electrode assembly 10 in the form of a jelly roll may be arranged parallel to a height direction of the case 20 (i.e., a vertical direction from the bottom surface of the case), and the upper and lower surfaces of the electrode assembly 10 may be flat and parallel to each other.

Although it is not shown in the drawing, the electrode assembly 10 may have a center pin in place of the wound shaft. When welding a first electrode tab 81 and a second electrode tab 82, which will be described later, to the cap plate 40 and the lower case 20, respectively, the center pin may make the welding work easier by making the first electrode tab 81 and the cap plate 40 be in close contact with one end, and the second electrode tab 82 and the lower case 20 in close contact with the other end. However, depending on a welding method or an assembly process of the rechargeable battery, the center pin may not exist.

Hereinafter, a case in which the first electrode 11 and the second electrode 12 are a negative electrode and a positive electrode, respectively, will be described as an example, but the present invention is not limited thereto, and the first electrode 11 and the second electrode 12 may be a positive electrode and a negative electrode, respectively.

A negative electrode 11 (i.e., the first electrode) is formed in the shape of a long band, and a negative electrode coated portion where a negative active material is applied to a current collector of a metal foil (e.g., Cu foil), and a negative electrode uncoated portion where the active material is not applied. The negative electrode uncoated portion may be positioned at one end in the length direction of the negative electrode.

The positive electrode 12 (i.e., the second electrode) has a long band shape, and includes a positive electrode coating portion and the active material are coated on a current collector of a metal foil (e.g., Al foil), which is an area where a positive electrode active material layer is applied, and a positive electrode uncoated portion where the active material is not applied. The positive electrode uncoated portion may be positioned at one end in the length direction of the positive electrode.

The first electrode tab 81 is fixedly installed to the first electrode 11, and the second electrode tab 82 is fixedly installed to the second electrode 12. The first electrode tab 81 and the second electrode tab 82 are respectively installed in the negative electrode uncoated portion and the positive electrode uncoated portion, and extend to be parallel to the wound axis of the electrode assembly 10, and then the ends may be bent toward the wound axis. For example, bent ends of the first electrode tab 81 and the second electrode tab 82 may be disposed on upper and lower portions of the electrode assembly 10, respectively.

The first electrode tab 81 is formed of an electrically conductive material such as copper or nickel, and is electrically connected to the cap plate 40 of the cap assembly 80. For example, the bent end of the first electrode tab 81 may be directly connected to an inner surface of the cap plate 40 by welding (e.g., laser welding).

The second electrode tab 82 is formed of an electrically conductive material such as nickel and aluminum, and is electrically connected to an inner bottom surface of the lower case 20 and an inner surface of the upper case 30. For example, the bent end of the second electrode tab 82 may be directly connected to the inner bottom surface of the lower case 20 or the inner surface of the upper case 30 by welding (e.g., laser welding).

Referring to FIG. 2 and FIG. 3, the rechargeable battery 1 according to the present embodiment may include a first insulation member 91 disposed between the second electrode tab 82 and the electrode assembly 10 and a second insulation member 92 disposed between the first electrode tab 81 and the electrode assembly 10.

For example, the first insulation member 91 and the second insulation member 92 may be disposed on the lower surface and the upper surface of the electrode assembly 10, respectively. Accordingly, the first insulation member 91 may be disposed between the lower surface of the electrode assembly 10 and the bent second electrode tab 82, and the second insulation member 92 may be disposed between the upper surface of the electrode assembly 10 and the bent first electrode tab 81.

The first insulation member 91 and the second insulation member 92 may have a disk shape to cover the entire upper and lower surfaces of the electrode assembly 10, but are not limited thereto, and they may cover a part of the upper and lower surfaces of the electrode assembly 10 and may have an opening through which the center pin or the first and second electrode tabs 81 and 82 pass.

Electrical contact between the second electrode tab 82 and the electrode assembly 10 may be prevented through the first insulation member 91, and electrical contact between the first electrode tab 81 and the electrode assembly 10 may be prevented through the second insulation member 92. In addition, it is possible to prevent electrical contact between the electrode assembly 10 and cases 20 and 30 through the first insulation member 91 and the second insulation member 92.

An external circumferential surface of the electrode assembly 10 may be surrounded by an insulating tape. Thus, the external circumferential surface of the electrode assembly 10 and the inner surfaces of the cases 20, and 30 can be electrically insulated while protecting the outside of the electrode assembly 10, The case is formed by a combination of the upper case 30 and the lower case 20 in the form of a half housing. The electrode assembly 10 is inserted into the upper case 30 with the lower open side, and a power portion of the upper case 30 is closed and sealed with the lower case 20 with the upper open side, and accordingly the electrode assembly 10 can be accommodated in the case. The case in which the upper case 30 and lower case 20 are combined forms a space in which the electrode assembly 10 and an electrolyte solution are accommodated. For example, the case may have a cylindrical shape, and may accommodate the cylindrical electrode assembly 10 therein.

Since the case is electrically connected to the second electrode tab 82, it is formed of a metallic material having electrical conductivity. In this case, the upper case 30 and the lower case 20 may have one side contacting each other and electrically connected, and, for example, may have the same polarity as the second electrode.

A penetration hole 31 is provided in the upper portion of the case, and thus the inner surface of the cap plate 40 may be exposed inside through the penetration hole 31. In this case, the cap plate 40 may be electrically connected to the first electrode tab 81 through the penetration hole 31.

According to the embodiment of the present invention, the upper case 30 and the lower case 20 may be combined such that some areas overlap. For example, the cylindrical lower case 20 may have a larger diameter than the cylindrical upper case 30, and the lower case 20 may be combined to accommodate the upper case 30.

In addition, according to the embodiment of the present invention, an upper end of the lower case 20 is protruded in the inner direction and thus may be fixed to an outer side of the upper case 30. Accordingly, it is possible to improve a fastening force and a close and seal force between the upper case 30 and the lower case 20.

The upper case 30 may include a support plate 34 supporting the cap plate 40 and an upper side plate 32 extending downward from the support plate 34. The support plate 34 and the upper side plate 32 may be integrally formed, or the support plate 34 and the upper side plate 32 may be connected by welding.

The support plate 34 may have a penetration hole 31 formed in a center thereof. The support plate 23 is a portion that is coupled to the cap plate 40 and may be arranged in parallel with the cap plate 40, and, for example, the support plate 23 may be parallel to the bottom surface of the lower case 20 and may be formed in the shape of a flat plate extending in the horizontal direction. For example, the support plate 23 may have a disk shape in which the circular penetration hole 31 is formed in the center.

Referring to FIG. 2 and FIG. 3, an auxiliary insulation member 70 that is formed of an electrically insulating material may be provided between the support plate 34 and the electrode assembly 10. For example, the auxiliary insulation member 70 may be positioned on the lower side of the support plate 34. Accordingly, it is possible to prevent the first electrode tab 81 drawn out to the upper portion of the electrode assembly 10 from contacting the support plate 34 having a different polarity.

The upper side plate 32 may have a shape extending in the vertical direction (up and down direction), and may have a shape surrounding the external circumferential surface of the electrode assembly 10. For example, the upper side plate 32 may have a shape extending downward (in the vertical direction) from an edge of the support plate 23 in the shape of a disk by a predetermined length.

According to the present embodiment, a concave groove portion 35 may be formed at an outer surface of the upper side plate 32. For example, the groove portion 35 may be extended along the circumference direction of the upper side plate 32, and the upper side plate 32 may be recessed in the inner direction. Since the groove portion 35 is a part into which a hook portion 25 of the lower case 20 to be described later is inserted, it may have a size and shape corresponding to the hook portion 25.

The lower case 20 may include a bottom plate 24 forming a base and a lower side plate 22 extending upward from the bottom plate 24. The bottom plate 24 and the lower side plate 22 may be integrally formed, or the bottom plate 24 and the lower side plate 22 may be connected by welding.

The bottom plate 24 may have a flat plate shape extending in the horizontal direction, and may have, for example, a disk shape. The bottom plate 24 may be parallel to a flat exterior side of the cap plate 40, which will be described later. A lower end of the upper side plate 32 of the upper case 30 may contact the bottom plate 24. Through this, the upper case 30 and the lower case 40 may be electrically connected.

The lower side plate 22 may have a shape extending in a vertical direction parallel to the upper side plate 32, and may have a shape surrounding at least a portion of the exterior side of the upper side plate 32. For example, the lower side plate 22 may have a shape extending from an edge of the bottom plate 24 in the shape of a disk to the top (in the vertical direction) by a predetermined length.

At the end of the lower side plate 22, that is, at the top, the hook portion 25 protruded in an inner direction may be formed. The hook portion 25 may have a shape protruded in the inner direction than the inner surface of the lower side plate 22. For example, the hook portion 25 may be bent and extended in the inner direction from the end of the lower side plate 22, and may be extended in the horizontal direction along the circumference of the end of the lower side plate 22.

Since the hook portion 25 is caught on the outside of the upper case 30, the hook portion 25 may contact the outside of the upper case 30. Through this, the upper case 30 and the lower case 40 may be electrically connected.

Referring to FIG. 4, the hook portion 25 may be inserted into the groove portion 35 of the upper case 30. A length D2 overlapping the upper side plate 32 by extending the hook portion 25 in the inner direction may be 30% or more of an upper side plate thickness D1.

The following Table 1 shows results of testing whether the upper case 30 and the lower case 20 are closed and sealed while varying the length D2 where the hook portion 25 overlaps the upper side plate 32. Referring to Table 1, it can be determined that the close and seal effect is maintained when the hook portion 25 extends in the inner direction and overlaps the upper side plate 32 with the length D2 of 30% or more of the upper side plate thickness D1.

TABLE 1

| D1 (mm) | D2 (mm) | Close and seal |
| --- | --- | --- |
| 0.15 | 0.15 | ○ |
| 0.15 | 0.10 | ○ |
| 0.15 | 0.05 | ○ |
| 0.15 | 0.03 | X |

As described above, the hook portion 25 may be inserted into the groove portion 35 of the upper case 30, and the groove portion 35 may be formed in various positions of the upper side plate 32. For example, as shown in FIG. 1 to FIG. 4, when the groove 35 is formed at a high position on the bottom plate 24 of the lower case 20, that is, at a position close to the cap plate 40, an overlapping area of the upper side plate 32 and the lower side plate 22 may be widened. Accordingly, it is possible to prevent deformation of the upper side plate 32 or the lower side plate 22 due to external impact or internal pressure.

Figure 5:
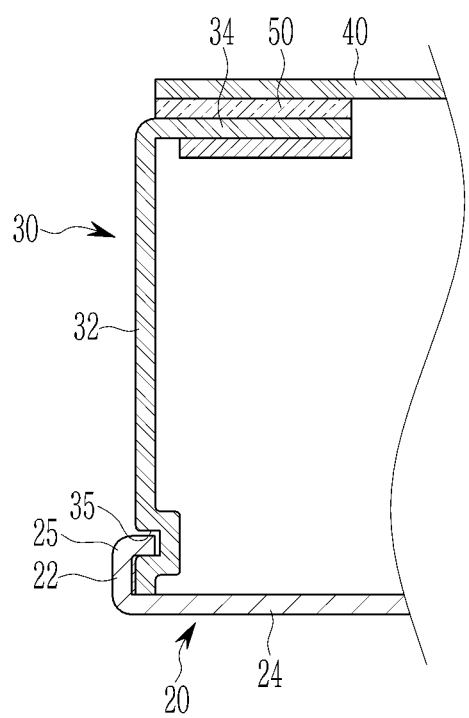
FIG. 5 shows a modified form of the rechargeable battery according to the first embodiment of the present invention.

FIG. 5 shows a modified form of the rechargeable battery according to the first embodiment of the present invention. Referring to FIG. 5, when the groove part 35 is formed in a lower position on the bottom plate 24 of the lower case 20, that is, at a position far from the cap plate 40, the overlapping area of the upper side plate 32 and the lower side plate 22 may be narrowed. However, it is possible to increase space efficiency while reinforcing the fastening force and the close and sealing force between the upper case 30 and the lower case 20.

In an area where upper case 30 and lower case 20 overlap, a sealing member 60 may be disposed between the upper case 30 and the lower case 20. Accordingly, it is possible to close and seal between the upper case 30 and the lower case 20 to prevent foreign substances or moisture from penetrating between the upper case 30 and the lower case 20.

For example, the sealing member 60 may be disposed between the upper side plate 32 and the lower side plate 22 in at least a part of the area where the upper side plate 32 and the lower side plate 22 overlap. The sealing member 60 may be formed by coating a sealing material on at least one of an exterior side of the upper side plate 32 and an interior side of the lower side plate 22. Alternatively, the sealing member 60 may be formed of a separate member from the upper side plate 32 and the lower side plate 22, and may be disposed between the upper side plate 32 and the lower side plate 22 when the upper case 30 and the lower case 20 are combined.

The cap plate 40 is a part that becomes an outer terminal while closing and sealing the case. The cap plate 40 is coupled with the upper case 30 to close and seal a penetration hole 31 formed in the upper case 30. Referring to FIG. 1 to FIG. 3, the cap plate 40 is coupled to a circumference of the penetration hole 31, and at least a part of the cap plate 40 is exposed to the outside and may be parallel to the bottom plate 24 of the lower case 20. Accordingly, upper and lower ends of the rechargeable battery 1 become outer terminals having different polarities, and may be formed side by side.

Since the cap plate 40 is electrically connected to the first electrode tab 81, the cap plate 40 may be electrically insulated from the upper case 30 that is electrically connected to the second electrode tab 82.

A bonding member 50 formed of an electrically insulating material is disposed between the cap plate 40 and the upper case 30, and the cap plate 40 may be joined to the circumference of the penetration hole 31 formed in the upper case 30 through the bonding member 50.

The upper case 30 and the cap plate 40 may be heat-bonded through the bonding member 50. For example, the bonding member 50 may be a heat-bonding film, and the bonding surface of the upper case 30 in contact with the heat-bonding film and a bonding surface of the cap plate 40 may be surface-treated through processes such as etching and digging grooves. Accordingly, it is possible to increase the bonding strength of the surface-treated bonding surface.

However, a method of bonding the upper case 30 and the cap plate 40 and the type of the bonding member 50 are not limited to the above-described example, and various bonding methods and various types of the bonding member 50 may be applied.

Referring to FIG. 1 to FIG. 5, the cap plate 40 is coupled to the outside of the upper case 30, and thus the entire cap plate 40 may be exposed to the outside. For example, the cap plate 40 may have a flat disk shape, and may cover the entire upper surface of the rechargeable battery 1. Accordingly, it is possible to increase the degree of freedom of a connection point when electrical connection is established from the outside by maximizing the area of the outer terminal, and it is possible to reduce the possibility of a short circuit between the cap plate 40 and the upper case 30.

Hereinafter, another embodiment of the present invention will be described. The description will be focused on features different from the above-described embodiment, and descriptions of the same configuration as the above-described embodiment will be omitted.

Figure 6:
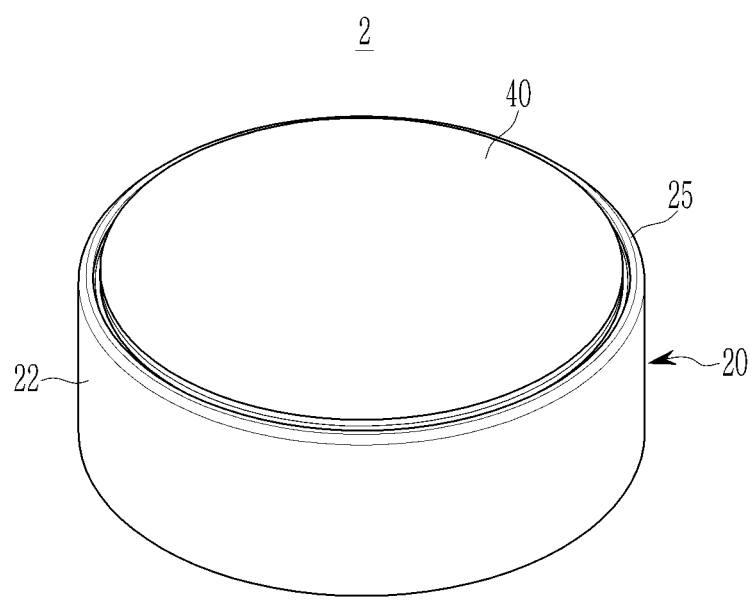
FIG. 6 is a perspective view of a rechargeable battery according to a second embodiment of the present invention.
Figure 7:
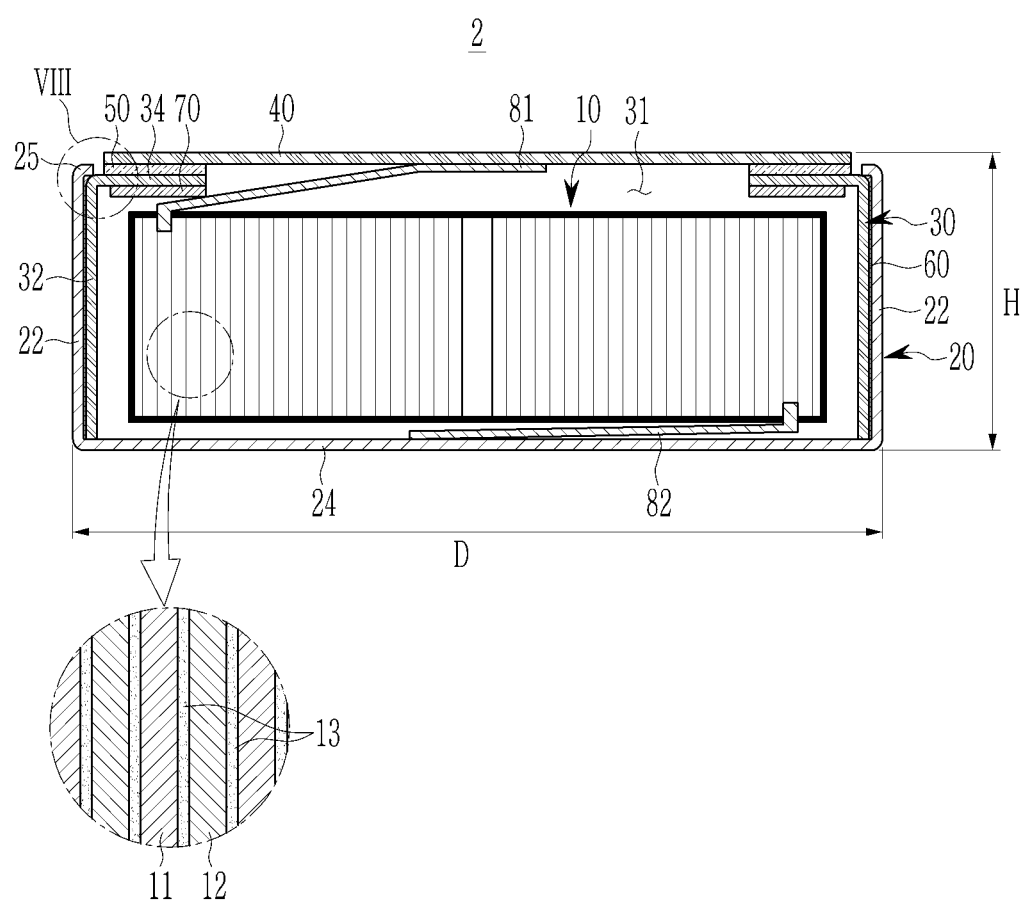
FIG. 7 is a cross-sectional view of the rechargeable battery according to the second embodiment of the present invention.
Figure 8:
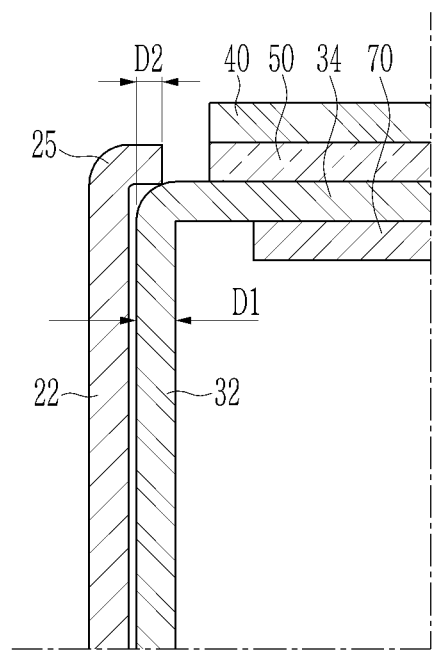
FIG. 8 is an enlarged view of the portion V III of FIG. 7.

FIG. 6 is a perspective view of a rechargeable battery according to a second embodiment of the present invention, FIG. 7 is a cross-sectional view of the rechargeable battery according to the second embodiment of the present invention, and FIG. 8 is an enlarged view of the portion V III of FIG. 7.

In a rechargeable battery 2 according to a second embodiment of the present invention, an upper case 30 may be accommodated in a lower case 20. Referring to FIG. 6 to FIG. 8, a lower side plate 22 of the lower case 20 may overlap the entire area of an upper side plate 32 of the upper case 20. Accordingly, the reinforcing effect of preventing deformation of the upper side plate 32 or the lower side plate 22 due to external impact or internal pressure can be increased by maximizing the overlapping area between the upper side plate 32 and the lower side plate 22.

According to the present embodiment, the groove 35 (refer to FIG. 3 and FIG. 4) may not be formed in the upper case 30. Alternatively, a hook portion 25 of the lower case 20 may extend to an upper surface of the upper case 30. For example, the hook portion 25 may extend in parallel with a support plate 34 of the upper case 30. Accordingly, the hook portion 25 may be caught and fixed to the upper surface of the upper case 30.

Like the first embodiment described above, referring to FIG. 8, a length D2 of the hook portion 25 overlapping the upper side plate 32 by extending in the inner direction may be 30% or more of an upper side plate thickness D1.

Figure 9:
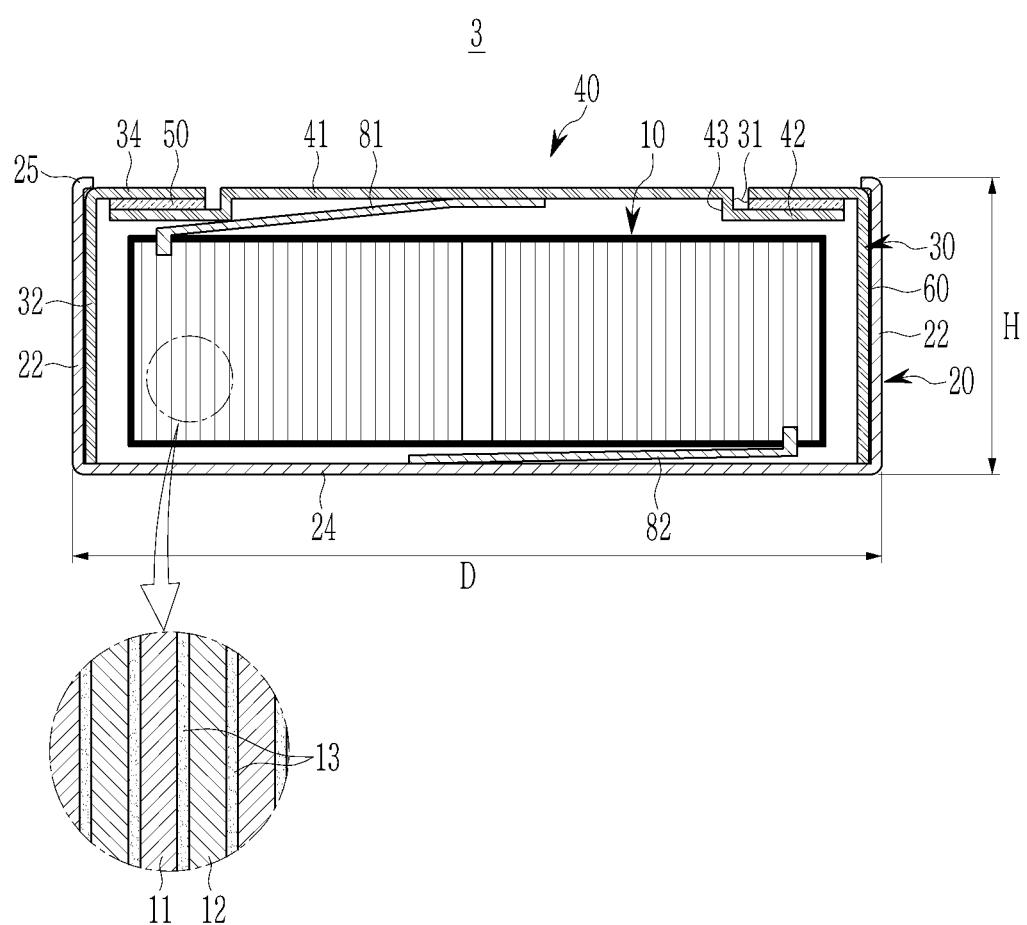
FIG. 9 is a cross-sectional view of a rechargeable battery according to a third embodiment of the present invention.

FIG. 9 is a cross-sectional view of a rechargeable battery according to a third embodiment of the present invention.

Referring to FIG. 9, a cap plate 40 may be coupled to an inner side of an upper case 30. The cap plate 40 is partially exposed to the outside through a penetration hole 31 of the upper case 30, and the exposed area becomes an outer terminal of the rechargeable battery 3 according to the present embodiment, and may have a flat shape parallel to a bottom plate 24 of a lower case 20.

For example, the cap plate 40 may be provided with a bonding portion 42 parallel to a support portion 34 of the upper case 30 in an edge region, and a terminal portion 41 exposed to the outside in a central region. A height of the terminal portion 41 at the bottom plate 24 may be higher than that of the bonding portion 42, and the terminal portion 41 may have a shape protruded toward the penetration hole 31.

In the present embodiment, since the cap plate 40 is coupled to the inside of the upper case 30, it is possible to increase the close and seal force between the cap plate 40 and the upper case 30 with respect to the internal pressure. In addition, not as in the above-described embodiment, an auxiliary insulation member 70 (refer to FIG. 3 and FIG. 7) is not required between a first electrode tab 81 and the support plate 34 of the upper case 30.

The rechargeable batteries 1, 2, and 3 according to the above-described embodiments of the present invention may be coin-type batteries or button-type batteries, and the height H (refer to FIGS. 3, 7, and 9) with respect to the diameter D (refer to FIGS. 3, 7, and 9) may have a ratio (H/D) of 1 or less.

As such, in the rechargeable battery according to the embodiment of the present invention, the cap plate 40 in the form of a flat plate is bonded to the case through the bonding member 50 that is formed of an electrical insulating material, and thus the polarity of the cap plate 40 and the case may be configured in a separate form while sufficiently securing the battery capacity.

In addition, it is possible to increase the fastening force and the close and seal force between the upper case 30 and the lower case 20 by engaging the upper case 30 and lower case 20 in an overlapping state with each other.

While this invention has been described in connection with what is presently considered to be practical embodiments, it is to be understood that the invention is not limited to the disclosed embodiments. On the contrary, it is intended to cover various modifications and equivalent arrangements included within the scope of the appended claims.

- Description of symbols -

| | |
|---|---|
| 1, 2, 3 rechargeable battery | 10 electrode assembly |
| 11 first electrode (negative electrode) | 12 second electrode (positive electrode) |
| 13 separator | 20 lower case |
| 22 lower side plate | 24 bottom plate |
| 25 hook portion | 30 upper case |
| 32 upper side plate | 34 support plate |
| 35 groove portion | 40 cap plate |
| 50 bonding member | 60 sealing member |
| 81 first electrode tab | 82 second electrode tab |
| 91 first insulation member | 92 second insulation member |

The invention claimed is:

1. A rechargeable battery comprising:
an electrode assembly including a first electrode, a second electrode, and a separator positioned between the first electrode and the second electrode;
a case including an upper case with a lower open side and having a penetration hole in an upper portion, and a lower case with an upper open side to close and seal the lower open side of the upper case, and accommodating the electrode assembly therein; and a cap plate coupled with the upper case to close and seal the penetration hole, and electrically insulated from the upper case, wherein the upper case and the lower case are coupled to be partially overlapped, and an upper end of the lower case protruded in an inner direction and caught and fixed at an outer side of the upper case, wherein the upper case and the lower case are coupled so as to be electrically connected to each other, and wherein a sealing member is provided between the upper case and the lower case in an area where the upper case and the lower case overlap.

2. The rechargeable battery of claim 1, wherein
one side of the upper case and one side of the lower case are in contact with each other and are electrically connected.

3. The rechargeable battery of claim 1, wherein
the cap plate is coupled to a circumference of the penetration hole, and is parallel with a bottom surface of the lower case while being at least partially exposed to an outside of the rechargeable battery.

4. The rechargeable battery of claim 3, wherein
the cap plate is coupled to an outside of the upper case and has a flat shape that is all exposed to the outside of the rechargeable battery.

5. The rechargeable battery of claim 3, wherein
the cap plate is coupled to an inside of the upper case and has a flat shape with a part exposed to the outside of the rechargeable battery.

6. The rechargeable battery of claim 1, wherein
a bonding member is provided between the upper case and the cap plate, and
the bonding member is formed of an electrically insulating material.

7. The rechargeable battery of claim 6, wherein
the upper case and the cap plate are heat-bonded through the bonding member.

8. The rechargeable battery of claim 1, further comprising
a first electrode tab that electrically connects the first electrode and the cap plate, and
a second electrode tab that electrically connects the second electrode and the case.

9. The rechargeable battery of claim 8, wherein
the electrode assembly is formed by spirally winding the first electrode, the second electrode, and the separator on a rotation axis that is arranged in a vertical direction on a bottom surface of the lower case.

10. The rechargeable battery of claim 9, wherein
the first electrode tab is extended to an upper portion of the electrode assembly and welded to an inner surface of the cap plate, and
the second electrode tab extends to a lower portion of the electrode assembly and is welded to an inner surface of the case.

11. The rechargeable battery of claim 10, further comprising
a first insulation member that is provided between the first electrode tab and the electrode assembly, and
a second insulation member that is provided between the second electrode tab and the electrode assembly.

12. The rechargeable battery of claim 1, wherein:
the upper case comprises a support plate to which the cap plate is coupled, and an upper side plate extending downward from the support plate,
the lower case comprises a bottom plate, and a lower side plate extending upward from the bottom plate to a top and having a hook portion protruded in an inner direction at an end,
at least a portion of the upper side plate and at least a portion of the lower side plate overlap each other in parallel.

13. The rechargeable battery of claim 12, wherein
a concave groove corresponding to the hook portion is formed in the upper side plate and thus the hook portion is inserted therein.

14. The rechargeable battery of claim 13, wherein
the hook portion extends in the inner direction and thus an overlapping length with the upper side plate is 30% or more of an upper side plate thickness.

15. The rechargeable battery of claim 12, wherein
the hook portion extends to a top surface of the upper case.

16. The rechargeable battery of claim 15, wherein
the hook portion extends in the inner direction and thus an overlapping length with the upper side plate is 30% or more of an upper side plate thickness.

17. The rechargeable battery of claim 1, wherein
the rechargeable battery has a height-to-diameter ratio of 1 or less.

* * * * *